United States Patent
Nozawa (10) Patent No.: US 7,855,779 B2
(45) Date of Patent: Dec. 21, 2010

(54) DISPLAY DEVICE AND DETECTION METHOD

(75) Inventor: Ryoichi Nozawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 426 days.

(21) Appl. No.: 12/126,630

(22) Filed: May 23, 2008

(65) Prior Publication Data

US 2008/0291430 A1    Nov. 27, 2008

(30) Foreign Application Priority Data

May 25, 2007  (JP)  ............................. 2007-138886
Apr. 3, 2008  (JP)  ............................. 2008-097167

(51) Int. Cl.
*G01N 21/00* (2006.01)
(52) U.S. Cl. .......................... 356/73; 345/104; 345/207
(58) Field of Classification Search ............. 356/72–73; 345/104, 207, 175
See application file for complete search history.

(56) References Cited

U.S. PATENT DOCUMENTS 7,321,672 B2 *  1/2008  Sasaki et al. ................. 382/124

FOREIGN PATENT DOCUMENTS

JP    2006-244446    9/2006

* cited by examiner

*Primary Examiner*—Tarifur Chowdury
*Assistant Examiner*—Abdullahi Nur
(74) *Attorney, Agent, or Firm*—Workman Nydegger (57) ABSTRACT

A display device includes display pixels that display an image on a display screen. First and second optical sensors correspond to one or more of the display pixels and detect the amount of incident light. An optical member allows light coming from a first direction to enter the first optical sensors and light coming from a second direction to enter the second optical sensors. A memory circuit stores a first detection result that is detected in a first time period by means of the first optical sensors and stores a second detection result that is detected in the first time period by means of the second optical sensors. A comparison circuit compares sequential detection results to permit a judgment circuit to determine whether the display screen has been touched with a detection target medium.

10 Claims, 8 Drawing Sheets

← DRIVER'S SEAT    FRONT PASSENGER'S SEAT →

FIG. 9

DISPLAY DEVICE AND DETECTION METHOD

BACKGROUND

1. Technical Field

The present invention relates to a technique for detecting whether a display screen is touched with a detection target medium or not by means of an optical detection method.

2. Related Art

As an example of the recent advancement of optical detection technology, a display device having an optical-detection input function has been developed in the technical field to which the present invention pertains. A display device of the related art that has an optical-based input capability is provided with optical sensors, each of which is provided for one pixel or a group of pixels. With these optical detectors, the related-art display device such as a liquid crystal panel, though not limited thereto, enables various kinds of information to be inputted through the display screen thereof. The optical sensor provided in the pixel of the related-art display device has, as an example of constituent elements thereof, a photodiode and a capacitor. In such a configuration, the quantity of electric charge of the capacitor changes in accordance with the amount of light received at the photodiode. On the basis of the detected voltage of each terminal of the capacitor, the amount of light received at the photodiode can be detected. In an effort to improve the accuracy in judgment made as to whether the display screen is (i.e., was) touched with a finger or not and to improve the accuracy in the calculated coordinate position thereof, an image-edge optical detection technique has been proposed, an example of which is disclosed in JP-A-2006-244446. In the related art described in JP-A-2006-244446, the edge of a picked-up (i.e., "photographed") image is detected. Then, on the basis of the acquired edge image, a judgment is made as to whether an object contacts the display surface or not.

In the above-identified related art of JP-A-2006-244446, a touch operation is detected on the basis of the "swelling" (i.e., enlargement) of a finger due to pressure applied at the time when a user touches a panel surface with the finger. For this reason, the above-identified related art of JP-A-2006-244446 cannot detect the touching of a display surface with any hard inelastic object (i.e., detection target medium) that cannot be deformed, unlike the finger, at the time of the touching thereon.

SUMMARY

An advantage of some aspects of the invention is to provide a display device that is capable of making optical detection as to whether or not the display surface thereof is touched not only with an elastic detection target medium but also with an inelastic detection target medium, that is, regardless of the elasticity/inelasticity of the detection target medium. In addition, the invention further provides, as an advantage of some aspects thereof, a detection method that is used by such a display device.

In order to address the above-identified problem without any limitation thereto, the invention provides, as a first aspect thereof, a display device that includes: a plurality of display pixels that displays an image on a display screen; a first optical sensor that is provided so as to correspond to either each one of the plurality of display pixels or each set of more than one pixel, the first optical sensor detecting the amount of incident light; a second optical sensor that is provided so as to correspond to either each one of the plurality of display pixels or each set of more than one pixel, the second optical sensor detecting the amount of incident light; an optical member that allows light coming from a first direction to enter the first optical sensors and allows light coming from a second direction to enter the second optical sensors, the second direction being different from the first direction; a memory circuit that stores a first detection result that is detected in a first time period by means of the first optical sensors and stores a second detection result that is detected in the first time period by means of the second optical sensors; a comparison circuit that compares, after the detection of a third detection result in a second time period that is subsequent to the first time period by means of the first optical sensors and the detection of a fourth detection result in the second time period by means of the second optical sensors, the third detection result with the first detection result and further compares the fourth detection result with the second detection result; and a judgment circuit that makes a judgment as to whether the display screen has been touched with a detection target medium or not on the basis of the result of comparison performed by the comparison circuit. With the configuration of the display device according to the first aspect of the invention described above, it is possible to judge whether the display screen has been touched with a detection target medium or not on the basis of the detection result of the first optical sensors and the detection result of the second optical sensors.

In the configuration of the display device according to the first aspect of the invention described above, it is possible to adopt a variety of members such as a light-shielding member or a lens layer, though not limited thereto, as the above-mentioned optical member. If a light-shielding member is used as the above-mentioned optical member, it is preferable that the light-shielding member should block incident light coming from the second direction toward the first optical sensors and should further block incident light coming from the first direction toward the second optical sensors. In such a preferred configuration of the display device according to the first aspect of the invention described above, the light-shielding member may have an opening that is formed at a border between the first optical sensor and the second optical sensor adjacent to each other. In particular, in such a preferred configuration of the display device according to the first aspect of the invention described above, it is further preferable that, when viewed in an observation direction of the display pixels or viewed from the back thereof, the centerline of the opening of the light-shielding member should be in alignment with the borderline between the first optical sensor and the second optical sensor adjacent to each other.

In the above-described preferred configuration of the display device according to the first aspect of the invention described above that employs a light-shielding member as the above-mentioned optical member (the light-shielding member blocks incident light coming from the second direction toward the first optical sensors and further blocks incident light coming from the first direction toward the second optical sensors), it is preferable that the display device should further include a black matrix that blocks light at a region each between two adjacent display pixels of the plurality of display pixels, wherein the black matrix doubles as the light-shielding member.

On the other hand, if a lens layer is used as the above-mentioned optical member, it is preferable that the lens layer (i.e., optical member) should be provided at a light-entering side of the first optical sensors and the second optical sensors; and the lens layer (i.e., optical member) should be a convex lens layer, the convex being formed at the light-entering side.

With such a preferred configuration, it is possible to improve the detection accuracy of the optical sensors.

The scope of the invention is not limited to a display device. That is, the invention can be embodied as a detection method that is used by a display device. If the invention is embodied as a detection method, it may have the following features: if it is judged that a distance between an image detected by the first optical sensors and an image detected by the second optical sensors is becoming smaller on the basis of the first detection result, the second detection result, the third detection result, and the fourth detection result, a moving speed of the image detected by the first optical sensors is calculated at the time when the third detection result is compared with the first detection result whereas a moving speed of the image detected by the second optical sensors is calculated at the time when the fourth detection result is compared with the second detection result; and it is judged that the detection target medium is coming closer from the first direction if the moving speed of the image detected by the first optical sensors is lower than the moving speed of the image detected by the second optical sensors whereas it is judged that the detection target medium is coming closer from the second direction if the moving speed of the image detected by the second optical sensors is lower than the moving speed of the image detected by the first optical sensors. Or, as another non-limiting aspect thereof, the invention can be embodied as a detection method that has the following features: it is judged that the display screen has been touched with the detection target medium at the time when the distance between the image detected by the first optical sensors and the image detected by the second optical sensors has become smaller than a predetermined threshold value.

BRIEF DESCRIPTION OF THE DRAWINGS

The invention will be described with reference to the accompanying drawings, wherein like numbers reference like elements.

DESCRIPTION OF EXEMPLARY
EMBODIMENTS

With reference to the accompanying drawings, exemplary embodiments of the invention are explained below. A display device according to the present embodiment of the invention can be used as the display unit of a car navigation system, which is a non-limiting example of the application/use thereof. In such an application examples the display device according to the present embodiment of the invention is mounted at the center of the dashboard of a vehicle. In the following explanation, a right-hand-drive vehicle, that is, a car with a right-hand steering wheel, is assumed as a non-limiting example of the application/use of the display device according to the present embodiment of the invention. Accordingly, a driver's seat is provided at the right side as viewed along the traveling direction (i.e., from back to front) of a vehicle whereas a front passenger's seat is provided at the left side as viewed along the traveling direction of the vehicle. Therefore, as viewed from the display device, or, in other words, as viewed in the reverse orientation of the above (i.e., from front to back), the driver's seat is provided at the left side whereas the front passenger's seat is provided at the right side.

Figure 1:
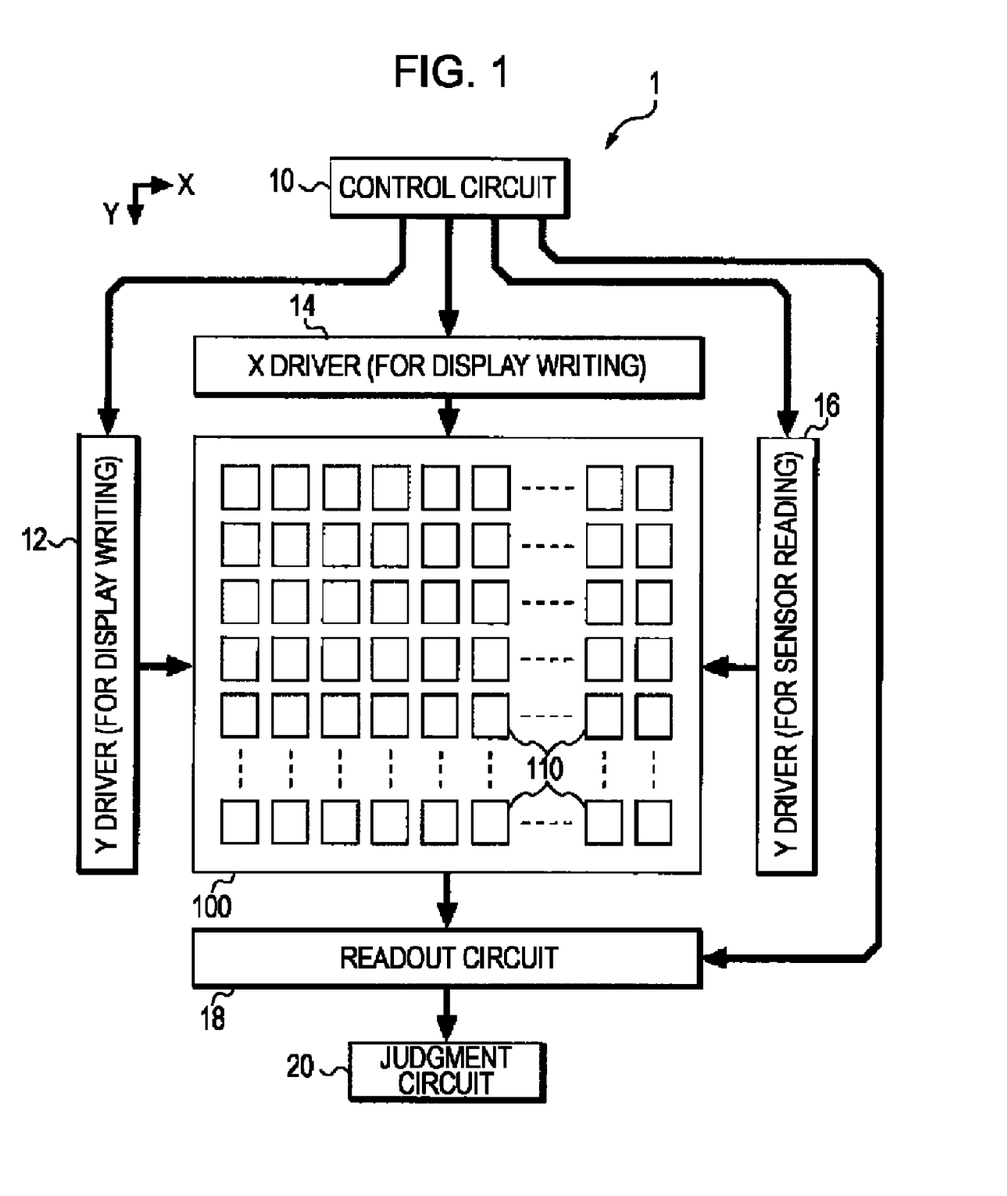
FIG. 1 is a diagram that schematically illustrates an example of the configuration of a display device according to an exemplary embodiment of the invention.

FIG. 1 is a diagram that schematically illustrates an example of the configuration of a display device 1 according to an exemplary embodiment of the invention. Any components of a car navigation system other than display-related constituent elements and input-related constituent elements are not illustrated in the drawing because they are not necessary to understand the fundamental configuration of the display device 1 according to the present embodiment of the invention. Accordingly, such unrelated components are not explained in this specification. As illustrated in the drawing, the display device 1 according to the present embodiment of the invention is provided with a control circuit 10, a Y driver (provided for "display writing") 12, an X driver 14, another Y driver (provided for "sensor reading") 16, a readout circuit 18, a judgment circuit 20, and a display panel 100. In the configuration of the display panel 100, a plurality of pixels 110 is arrayed in a matrix pattern.

Figure 2:
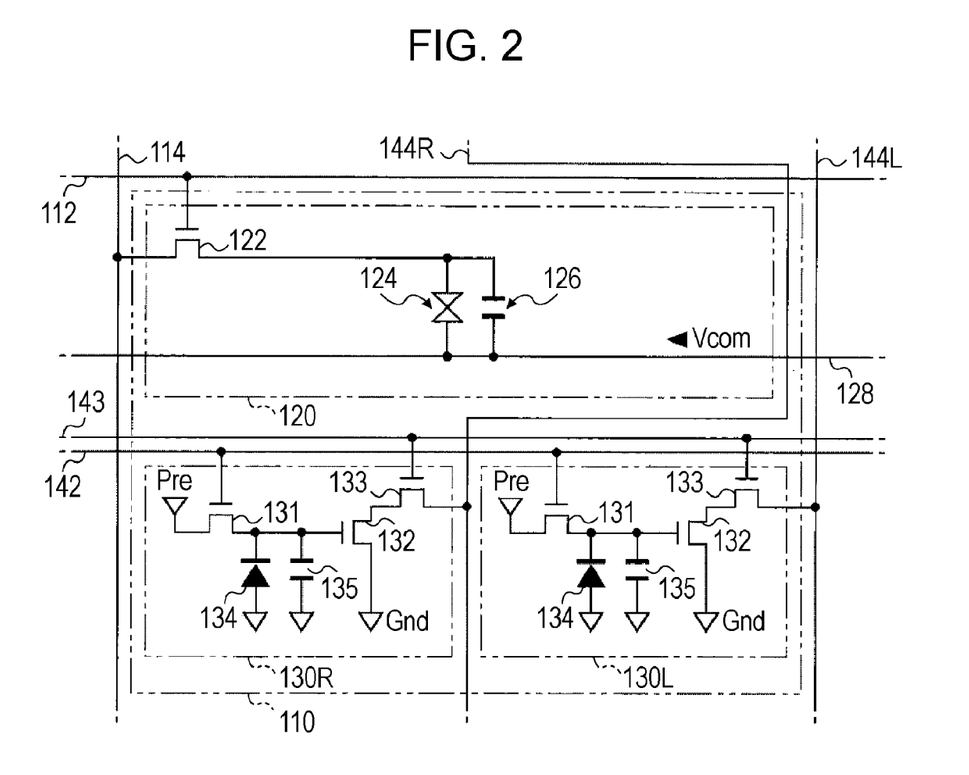
FIG. 2 is a diagram that schematically illustrates an example of the configuration of one of a plurality of pixels that are arrayed in the display device according to an exemplary embodiment of the invention.

Next, the circuit configuration of the pixel 110 is explained below while referring to FIG. 2. In the actual implementation of the invention, the pixels 110 are arrayed in a matrix layout as illustrated in FIG. 1 (as explained above). FIG. 2 focuses on one of these pixels that are arrayed in the matrix layout. In the matrix array of the plurality of pixels 110, a plurality of scanning lines 112 extends in the X direction whereas a plurality of data lines 114 extends in the Y direction. Each line of pixels 110 that constitutes one of a plurality of rows of the matrix share the corresponding one of these scanning lines 112. On the other hand, each line of pixels 110 that constitutes one of a plurality of columns of the matrix share the corresponding one of these data lines 114. In like manner, each line of pixels 110 that constitutes one of the plurality of rows of the matrix share the corresponding one of plural sets of control lines 142 and 143, whereas each line of pixels 110 that constitutes one of the plurality of columns of the matrix share the corresponding one of plural pairs of readout lines 144R and 144L.

As illustrated in FIG. 2, each of the pixels 110 basically includes a display system 120 and optical sensors 130R and 130L. It should be noted that the term "display system" is used in this specification so as to refer to the display-related constituent block (i.e., "circuitry") of each pixel 110, which contributes to image display. The display system 120 of the pixel 110, or, in other words, the display pixel 120, is made up of, though not necessarily limited thereto, a n-channel transistor 122, a liquid crystal element 124, and a storage capacitor (i.e., storage capacitance) 126. The gate electrode of the transistor 122 is connected to the scanning line 112. The source electrode of the transistor 122 is connected to the data line 114. The drain electrode of the transistor 122 is connected to one terminal of the liquid crystal element 124 and to one terminal of the storage capacitor 126 in a parallel manner. The above-described one end of the liquid crystal element 124 that is connected to the drain electrode of the transistor 122 constitutes a pixel electrode. The other terminal of the liquid crystal element 124 is connected to a common electrode 128, which is shared among the array of pixels 110. The voltage of the other terminal of the liquid crystal element 124 is maintained at the level of Vcom. In the circuit configuration of the pixel 110 according to the present embodiment of the invention, for the purpose and convenience of explanation, it is electrically assumed that not only the other terminal of the liquid crystal element 124 but also the other terminal of the storage capacitor 126 are connected to the common electrode 128 because the other terminal of the storage capacitor 126 provided in each pixel 110 is kept at the same voltage of Vcom.

The liquid crystal element 124 is a transmissive-type device. As known in the art, the liquid crystal element 124 is basically made up of the aforementioned pixel electrode that is connected to the drain electrode of the transistor 122 and a common electrode (128) that is common to the pixels 110 with liquid crystal being sandwiched between the pixel electrode and the common electrode. Since the liquid crystal element 124 has such a configuration, the transmission factor thereof changes in accordance with the actual value of a voltage held between the pixel electrode and the common electrode. The transistor 122 switches ON at the time when the level of a voltage supplied to the scanning line 112 reaches a value that is not smaller than a predetermined threshold value, which is hereafter referred to as a high level (i.e., H level). As the transistor 122 turns ON, a voltage supplied to the data line 114 is applied to the pixel electrode of the liquid crystal element 124 that has the above-described configuration. Therefore, upon the application of a certain voltage that is in accordance with a desired gradation to the data line 114 at the time when the voltage supplied to the scanning line 112 is at the H level, a difference voltage, which is the difference between the voltage of the desired gradation and the voltage of Vcom, is written into the liquid crystal element 124. The transistor 122 switches OFF at the time when the level of a voltage supplied to the scanning line 112 falls to a value that is smaller than the predetermined threshold value, which is hereafter referred to as a low level (i.e., L level). Although the switching state of the transistor 122 turns to OFF as the voltage supplied to the scanning line 112 falls to the L level, the differential voltage that has been written in the liquid crystal element 124 is maintained (i.e., kept or held) firstly because of the voltage maintenance property of the liquid crystal element 124 itself and secondly because of the presence of the storage capacitor 126 that is provided in parallel with the liquid crystal element 124. Therefore, the transmission factor of the liquid crystal element 124 takes a value corresponding to the maintained difference voltage.

The electric configuration of the optical sensory 130R is the same as that of the optical sensor L. Therefore, in the following description, the electric configuration of the optical sensor 130R is taken as an example. The optical sensor 130R is provided with, though not necessarily limited thereto, a plurality of transistors 131, 132, and 133, a PIN photodiode 134, and a sensor capacitor (i.e., sensor capacitance) 135. The transistor 131 pre-charges a voltage into the sensor capacitor 135. The gate electrode of the transistor 131 is connected to the control line 142. The source electrode of the transistor 131 is connected to a feeder line (i.e., electric supply line) that supplies a voltage Pre. The drain electrode of the transistor 131 is connected to the cathode of the photodiode 134 and one terminal of the sensor capacitor 135. In addition, the drain electrode of the transistor 131 is further connected to the gate electrode of the transistor 132. The photodiode 134 and the sensor capacitor 135 are connected in parallel with each other between the drain electrode of the transistor 131 and a reference-voltage ground potential Gnd. Or, in other words, the photodiode 134 and the sensor capacitor 135 are connected in parallel with each other between the gate electrode of the transistor 132 and the reference-voltage ground potential Gnd. The source electrode of the transistor 132 is connected to the ground potential Gnd. The drain electrode of the transistor 132 is connected to the source electrode of the transistor 133. The transistor 133 functions as a readout transistor. The gate electrode of the readout transistor 133 is connected to the control line 143. The drain electrode of the readout transistor 133 is connected to the readout line 144R.

The light-receiving layer (i.e., light reception layer or light-sensitive layer) of the photodiode 134 is formed as the same layer as the active layer of each of the transistors 122, 131, 132, and 133. Specifically, a lamination of the P layer, I layer, and N layer of the photodiode 134, which constitutes the p-i-n structure thereof, is formed as the same layer as the active layer of each of the transistors 122, 131, 132, and 133. Such a layer structure is advantageous in that it is possible to form the PIN light-sensitive layer of the photodiode 134 and the active layer of each of the transistors 122, 131, 132, and 133 in the same single layer deposition step, thereby simplifying production thereof.

In the following description, the operation of the optical sensor 130R is explained. The transistor 131 switches ON at the time when the level of a voltage supplied to the control line 142 reaches the H level. As the transistor 131 turns ON, a voltage Pre is pre-charged into the sensor capacitor 135. The transistor 131 switches OFF at the time when the level of a voltage supplied to the control line 142 falls to the L level. As the transistor 131 turns OFF, a larger amount of leakage current flows at the photodiode 134 in the reverse bias direction as the amount of incident light becomes larger. As a result thereof, a hold voltage that is kept (i.e., maintained or held) at the sensor capacitor 135 decreases from the pre-charge voltage Pre. Specifically, one terminal of the sensor capacitor 135 substantially maintains the pre-charge voltage Pre if the amount of leakage current flowing from the photodiode 134 is small. As the amount of leakage current flowing at the photodiode 134 increases, the voltage of the sensor capacitor 135 approaches zero. Upon the turning of a voltage supplied to the control line 143 to the H level after the pre-charging of the readout line 144R at a predetermined voltage, the transistor 133 switches ON; as a result thereof, the drain electrode of the transistor 132 is electrically connected to the readout line 144R. If the amount of incident light that has entered the photodiode 134 is small, which means that the abovementioned one end of the sensor capacitor 135 is substantially (i.e., almost) maintained at the pre-charge voltage Pre, the switching state of the transistor 132 is substantially put into ON. As the transistor 132 switches to the almost ON state, the level of a voltage of the readout line 144R sharply changes from the pre-charge voltage level toward the zero level. On the other hand, if the amount of incident light that has entered the photodiode 134 is large, which means that the voltage level of the abovementioned one end of the sensor capacitor 135 is at almost zero due to the leakage current, the switching state of the transistor 132 is substantially put into OFF. As the transistor 132 switches to the almost OFF state, the level of a voltage of the readout line 144R hardly changes from the pre-charge voltage level.

That is, detection is made as to whether the level of a voltage supplied to the readout line 144R changes from the pre-charge voltage level or not as a result of the changing of the voltage level of the control line 142 from the H level to the L level and the subsequent setting of the voltage level of the control line 143 into the H level. Then, on the basis of the result of such detection, it is possible to judge whether the amount of incident light that has entered the optical sensor 130R that is provided at a position corresponding to the intersection of the control line 142 (i.e., control line 143) and the readout line 144R is large or small. Although the operation of the optical sensor 130R is explained above, the same explanation holds true for the optical sensor 130L. That is, detection is made as to whether the level of a voltage supplied to the readout line 144L changes from the pre-charge voltage level or not as a result of the changing of the voltage level of the control line 142 from the H level to the L level and the subsequent setting of the voltage level of the control line 143 into the H level. Then, on the basis of the result of such detection, it is possible to judge whether the amount of incident light that has entered the optical sensor 130L that is provided at a position corresponding to the intersection of the control line 142 (i.e., control line 143) and the readout line 144L is large or small.

In the foregoing description made while referring to the illustrated example of FIG. 2, it is explained that the scanning line 112 as well as the control lines 142 and 143 are provided as discrete lines that are separated from one another. However, the scope of the invention is not limited to such an exemplary configuration. For example, one combination line may double as any two or all of them. In addition, in the foregoing description made while referring to the illustrated example of FIG. 2, it is explained that the data line 114 and the feeder line of the pre-charge voltage Pre are provided as discrete lines that are separated from each other. However, the scope of the invention is not limited to such an exemplary configuration. For example, one combination line may double as the data line 114 and the pre-charge voltage Pre feeder line. In the foregoing description of the circuit configuration of the pixel 110 according to the present embodiment of the invention, it is explained that one set of optical sensors 130R and 130L is provided for each display system 120 in a one-to-one correspondence. However, the scope of the invention is not limited to such an exemplary configuration. As a non-limiting modification example thereof, one set of optical sensors 130R and 130L may be provided for each set (i.e., group) of four display systems 120. Or, as another non-limiting modification example thereof, one set of optical sensors 130R and 130L may be provided for each set of two display systems 120. That is, one set of optical sensors 130R and 130L may be provided for each set of a plurality of display systems 120.

Referring back to FIG. 1, the configuration of the display device 1 according to the present embodiment of the invention is further explained below. The control circuit 10 controls the operation of each of the display-writing Y driver 12, the X driver 14, the sensor-reading Y driver 16, and the readout circuit 18. Under the control of the control circuit 10, the display-writing Y driver 12 makes sequential selection among the scanning lines 112 provided on the display panel 100. In such sequential selection made among the scanning lines 112, the display-writing Y driver 12 sets the currently-selected scanning line at the H level while setting remaining scanning lines 112 other than the currently selected one at the L level. The X driver 14 applies voltages that respectively correspond to the gradations of the pixels 110 that are aligned along the selected scanning line 112 to the respective data lines 114. The X driver 14 receives an image signal that is to be displayed on the display screen from a host (e.g., upper-layer) control circuit that is not illustrated in the drawing. Then, the X driver 14 converts the voltage of the received image signal into one that is suitable for image display. Subsequently, the X driver 14 supplies the converted voltage to the data lines 114.

Under the control of the control circuit 10, the sensor-reading Y driver 16 changes the voltage level of the control line 142 provided on the display panel 100 from the H level to the L level and subsequently sets the voltage level of the control line 143 provided thereon, which constitutes the counterpart thereof, into the H level. The sensor-reading Y driver 16 performs the above-described level change/setting operation in a sequential manner for each row of the pixels 110. Or, in other words, the sensor-reading Y driver 16 sequentially performs the above-described level change/setting operation one row after another thereof. The readout circuit 18 doubles as, that is, functions also as, detection circuit. The detection circuit 18 reads out a voltage after the pre-charging of the readout lines 144R and 144L of each column so as to make detection as to whether the readout voltage has changed from the pre-charge voltage or not. Specifically, the readout circuit 18 judges (i.e., detects) that the amount of incident light that entered the optical sensor provided in the pixel 110 that is formed at a position corresponding to the intersection of the column of the readout line and the current row that is now being selected by the sensor-reading Y driver 16 is large if the voltage of the readout line has changed from the pre-charge voltage to zero. On the other hand, the readout circuit 18 judges that the amount of incident light that entered the optical sensor provided in the pixel 110 that is formed at a position corresponding to the intersection of the column of the readout line and the current row that is now being selected by the sensor-reading Y driver 16 is small if the voltage of the readout line has not changed from the pre-charge voltage.

Therefore, through the sequential selection of the scanning lines 112 and the subsequent application of a voltage that is in accordance with the gradation of each pixel that lies on the row corresponding to the selected scanning line 112 to the corresponding data line 114, it is possible to allow the liquid crystal element 124 of the display system 120 thereof to hold (i.e., maintain or keep) a voltage that is in accordance with the gradation. In addition, through the sequential control of each pair (i.e., each row) of the control lines 142 and 143 and the judgment of voltage changes of the readout lines 144R and 144L of each column at the time of the control of each row of the control lines 142 and 143, it is possible to detect the amount of incident light that entered the optical sensors for each pixel. In the following description, the length of time required for performing the above-described sequential control from the first row of the control lines 142 and 143 through the last row thereof is referred to as "sensor frame time period". In the circuit configuration of the pixel 110 (display device 1) according to the present embodiment of the invention, it is explained that the scanning line 112 as well as the control lines 142 and 143 are provided as discrete lines that are separated from one another. Therefore, the sensor frame time period is independent of a vertical scanning time period, the latter of which is required for image display.

The judgment circuit 20 stores the detection results of the optical sensors 130R and 130L for all pixels for more than one frame (i.e., frame time periods). On the basis of the memorized detection results thereof, the judgment circuit 20 makes a judgment as to the input operation status of the display panel 100 in accordance with the detection procedure that will be described later. Accordingly, the judgment circuit 20 functions also as a memory circuit and a comparison circuit.

Figure 3:
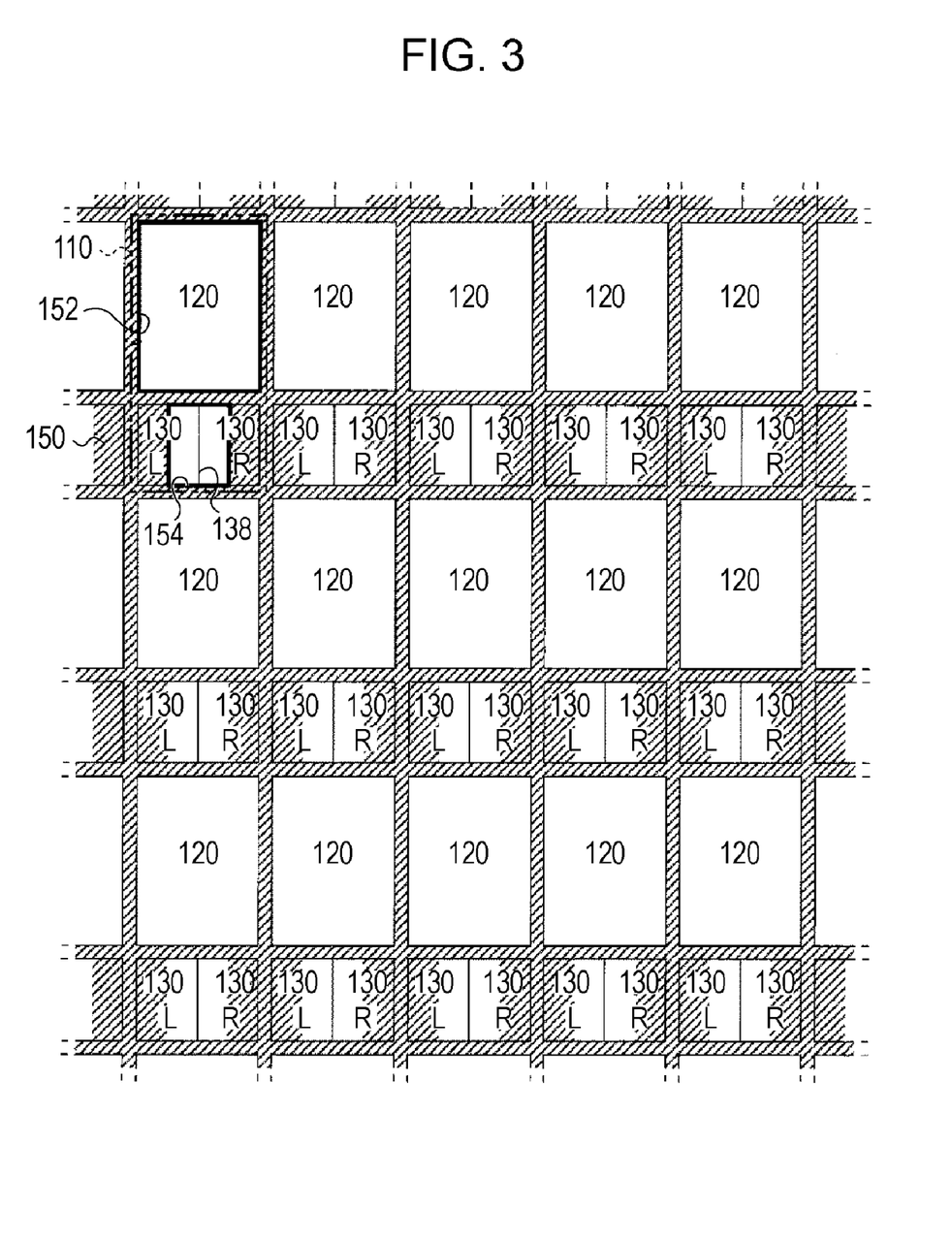
FIG. 3 is a diagram that schematically illustrates an example of the layout configuration of a light-shielding member and the plurality of pixels that are arrayed in the display device according to an exemplary embodiment of the invention.

FIG. 3 is a plan view that schematically illustrates an example of the configuration of a light-shielding member (e.g., black matrix) that has a black-matrix layout corresponding to the matrix array pattern of the plurality of pixels 110, where the drawing provides a rear-surface view of the display panel 100 that is shown in the reverse orientation of the monitor-observing direction with the top of the display panel 100 being the top of sheet of the drawing. Since it is assumed in FIG. 6 that the display panel 100 is viewed from the back thereof (or, in other words, the display panel 100 is viewed from the "bottom" of FIG. 6, which will be described later), the driver's seat is provided at the left side (under the assumption of a right-hand-drive vehicle) whereas the front passenger's seat is provided at the right side. Note that FIG. 3 will be reversed into a mirror-image layout if viewed along the monitor-observing direction thereof. As illustrated in FIGS. 1 and 3, the pixels 110 have a matrix array pattern that is made up of a number of rows and columns, as has already been described earlier. The display system 120 of each of these pixels 110 has a rectangular shape. A set of optical sensors 130R and 130L of each of these pixels 110 is arrayed under the corresponding display system 120 thereof in such a manner that the optical sensors 130R and 130L are arrayed horizontally adjacent to each other.

A light-shielding member 150 has a layout that is illustrated as a hatched area (shown as a shaded area) in FIG. 3. As illustrated in the drawing, the light-shielding member 150 has one rectangular open area 152 that is shaped so as to conform to the shape of the display system 120. In addition, the light-shielding member 150 has another rectangular open area 154 that is formed corresponding to the pair of the optical sensors 130R and 130L. As shown in FIG. 3, the optical sensors 130R and 130L are arrayed in an alternate manner. The light-shielding member 150 covers each area where the optical sensors are arranged in the order of 130R and 130L (in the order of appearance herein) as viewed from the left to the right in FIG. 3, or, in other words, each area where the optical sensor 130R is arrayed at the left side thereof and the optical sensor 130L is arrayed at the right side thereof, in such a manner that the light-shielding member 150 extends from the optical sensor 130R to the optical sensor 130L across the above-mentioned area. On the other hand, at each area where the optical sensors are arranged in the order of 130L and 130R (in the order of appearance herein) as viewed from the left to the right in FIG. 3, that is, at each area where the optical sensor 130R is arrayed at the right side thereof and the optical sensor 130L is arrayed at the left side thereof, the aforementioned opening 154 is formed so as to extend from the optical sensor 130L to the optical sensor 130R across the border line therebetween. The layout position of the light-shielding member 150 is determined in such a manner that the borderline between the optical sensor 130R and the optical sensor 130L, which constitute a pair of detectors provided in each pixel 110, is aligned with the centerline 138 of the rectangular shape (e.g., open area 154) of the light-shielding member 150. An example of such a center-matched configuration is illustrated in FIG. 3. The light-shielding member 150 may be modified as long as the open area 154 thereof exposes the borderline between the optical sensor 130R and the optical sensor 130L, which constitute a pair of detectors provided in each pixel 110, and further as long as the light-shielding member 150 covers a border region between the optical sensor 130R of one pixel 110 and the optical sensor 130L of another pixel 110 that is adjacent to the above-mentioned one pixel 110.

Figure 4:
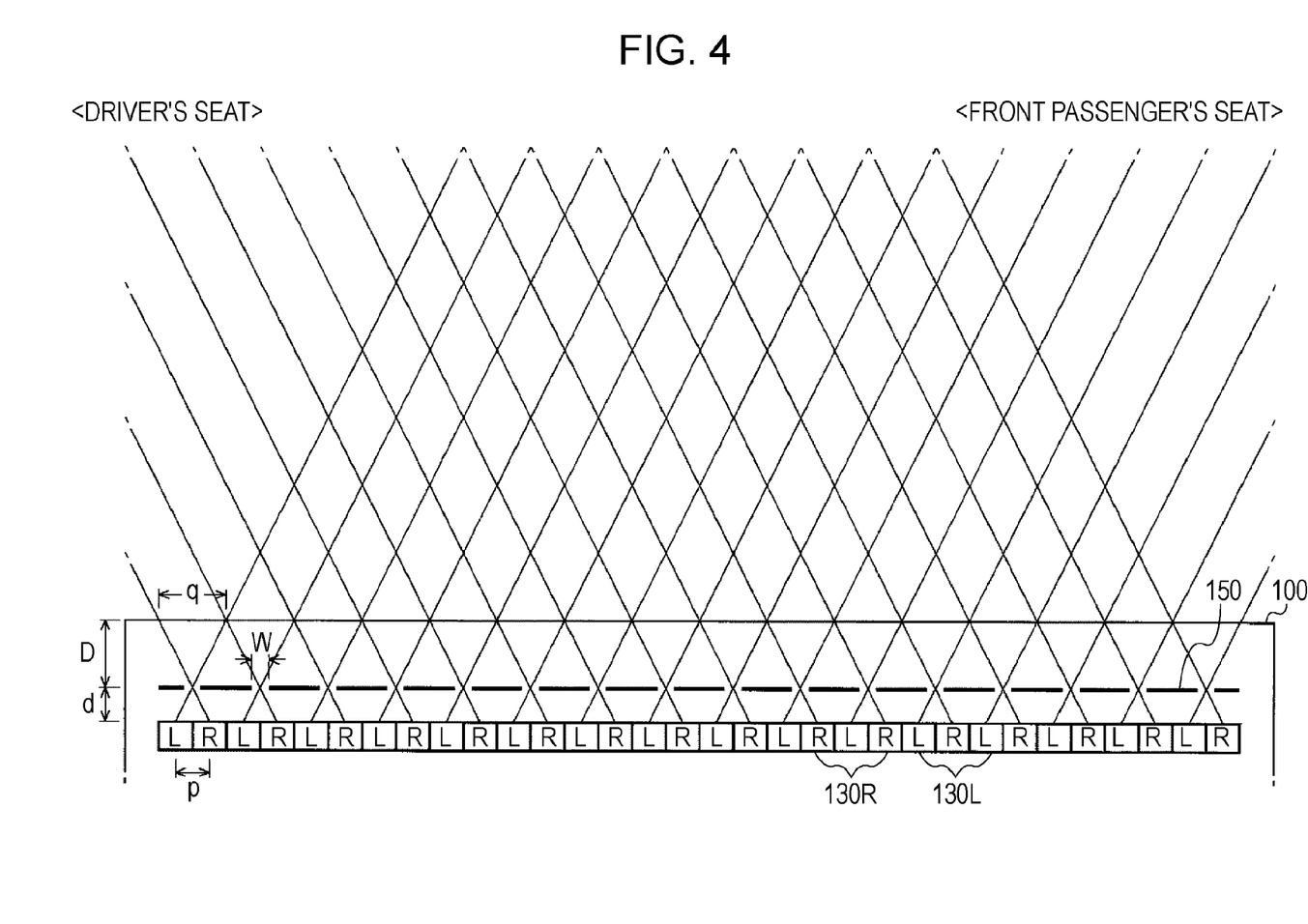
FIG. 4 is a diagram that schematically illustrates an example of the optical path of the display device according to an exemplary embodiment of the invention.

FIG. 4 is a conceptual diagram that schematically illustrates an example of the partial configuration of the display panel 100 in its cross section, where the top of the display panel 100 is shown as the near (i.e., proximal) side on the sheet of the drawing. As illustrated in FIG. 4, the light-shielding member 150 is provided at a layer position that is closer to the monitor-observation-side surface than the optical sensors 130R and 130L. Or, in other words, the distance between the monitor-observation-side surface and the light-shielding member 150 is shorter than the distance between the monitor-observation-side surface and the optical sensors 130R and 130L. Accordingly, each of the optical sensors 130R is exposed toward the driver's seat but not toward the front passenger's seat. On the other hand, each of the optical sensors 130L is exposed toward the front passenger's seat but not toward the driver's seat. With such an optical configuration, incident light coming from the front passenger's seat toward each of the optical sensors 130R is blocked at the light-shielding member 150 and thus does not actually enter each of the optical sensors 130R whereas incident light coming from the driver's seat toward each of the optical sensors 130R is not blocked at the light-shielding member 150 and thus enters each of the optical sensors 130R. In like manner, incident light coming from the driver's seat toward each of the optical sensors 130L is blocked at the light-shielding member 150 and thus does not actually enter each of the optical sensors 130L whereas incident light coming from the front passenger's seat toward each of the optical sensors 130L is not blocked at the light-shielding member 150 and thus enters each of the optical sensors 130L. As a non-limiting example of modified configuration thereof, the array pitch "p" of the optical sensors 130R and 130L and/or the width W of the open areas of the light-shielding member 150 may gradually change from the center of the display panel 100 toward each end thereof in order to ensure that the extension lines of incident beams coming toward the optical sensors 130R converge on the driver's seat whereas the extension lines of incident beams coming toward the optical sensors 130L converge on the front passenger's seat. If the liquid crystal element 124 is configured as a transmissive-type device as in the configuration of the display device 1 according to the present embodiment of the invention, or if the liquid crystal element 124 is configured as a transflective-type device that will be described later, light emitted from a backlight illumination device transmits through the liquid crystal element 124. Another light-shielding film that constitutes a layer different from that of the light-shielding member 150 is formed between the aforementioned active layer of the transistor (and thus, the light-receiving layer of the photodiode 134) and the backlight so as to ensure that light emitted from the backlight does not enter the aforementioned active layer of the transistors and the light-receiving layer of the photodiode 134.

Figure 6:
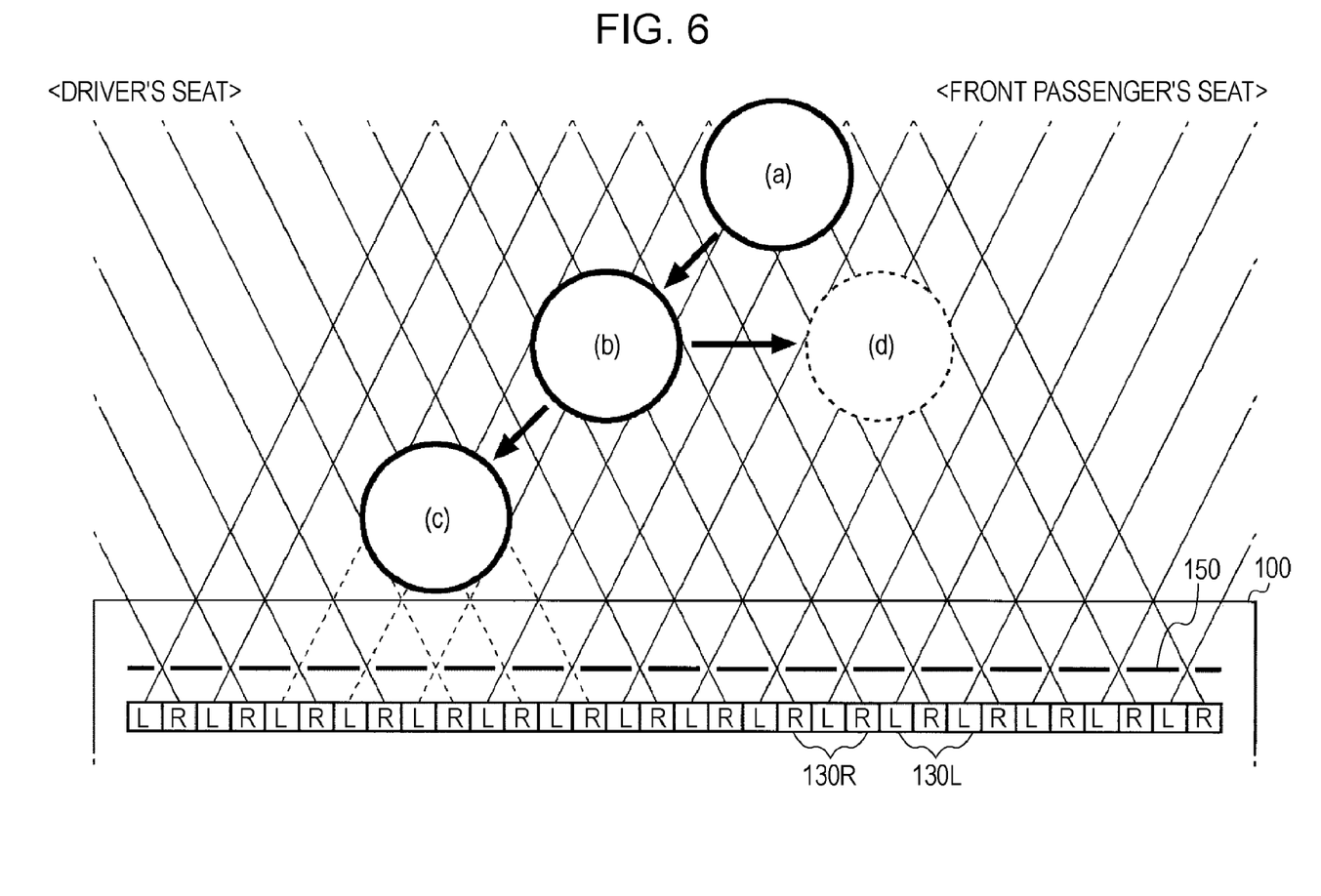
FIG. 6 is a diagram that schematically illustrates an example of the detection of a target medium that is performed by the display device according to an exemplary embodiment of the invention.
Figure 7A:
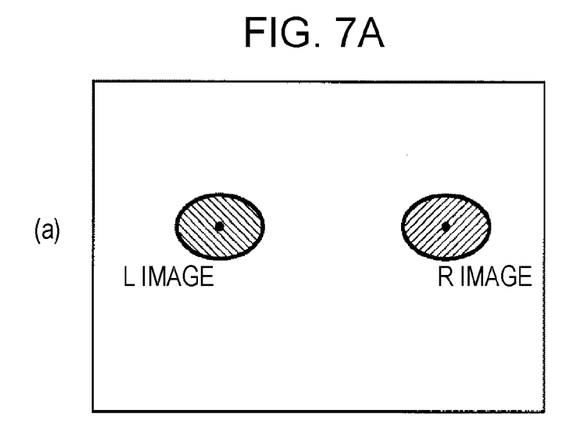
FIGS. 7A, 7B, and 7C is a set of diagrams that schematically illustrates an example of the detection of a target medium that is performed by the display device according to an exemplary embodiment of the invention.
Figure 7B:
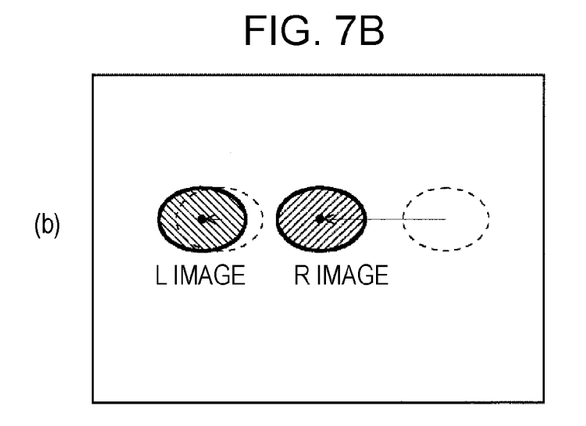
Figure 7C:
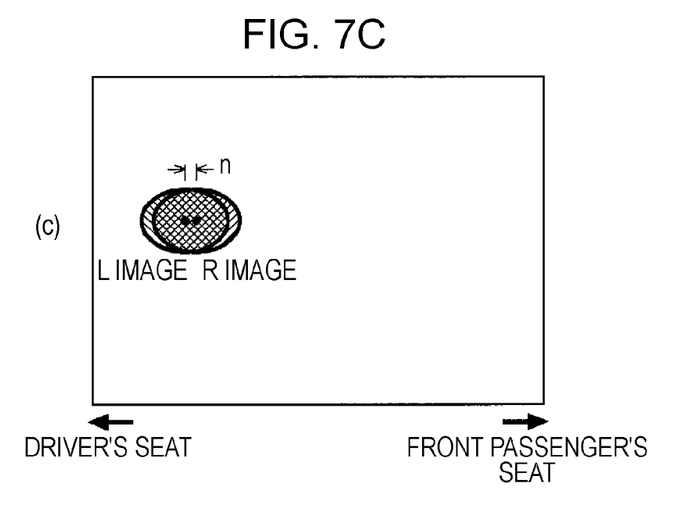

Next, the principle that governs the input detection of the display panel 100 by means of the optical sensors 130R and 130L is explained below. FIG. 6 is a diagram that schematically illustrates an example of the approaching of a detection target medium such as a finger, though not limited thereto, which is viewed from above the display panel 100. It should be noted that, in FIG. 6, the detection target medium is shown as a spherical object. FIGS. 7A, 7B, and 7C is a set of diagrams that shows an example of a change in light amount (i.e., L/R image change) obtained as a result of the approaching of a detection target medium. Under light ambient conditions, the shade of a detection target medium such as a finger of a user is formed if the detection target medium is held in front of the display panel 100 at a position between the driver's seat (side) and the front passenger's seat (side). Or, in other words, a dark shaded region against the light background is produced under such ambient conditions. In such a case, the optical sensors 130R and 130L detect the dark-shaded target medium. On the other hand, under dark ambient conditions, a few examples of which include nighttime driving and "in-tunnel" traveling of a vehicle, though not limited thereto, light that has been emitted from the backlight (which is not shown in the drawing) is reflected at the detection target medium. Then, the reflected light enters the optical sensors 130R and 130L. In such a case, the optical sensors 130R and 130L detect an image of the target medium having a greater luminosity in comparison with the dark background. Therefore, in either case, that is, regardless of whether ambient conditions are light or dark, it suffices to recognize an image region (i.e., image portion) that has a larger/smaller light amount in comparison with that of a background region (i.e., background portion) as L/R images, where the target detected by the optical sensors 130R can be treated as an R image thereof whereas the target detected by the optical sensors 130L can be treated as an L image thereof.

Figure 8A:
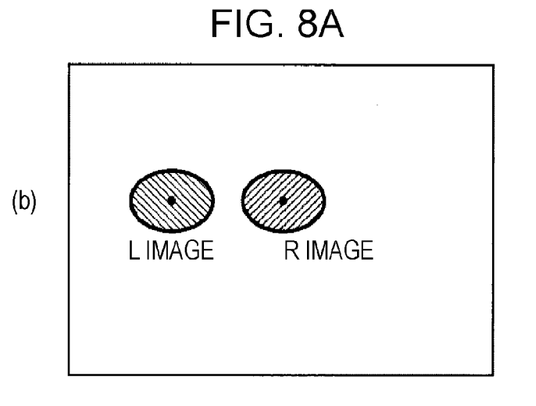
FIGS. 8A and 8B is a set of diagrams that schematically illustrates an example of the detection of a target medium that is performed by the display device according to an exemplary embodiment of the invention.
Figure 8B:
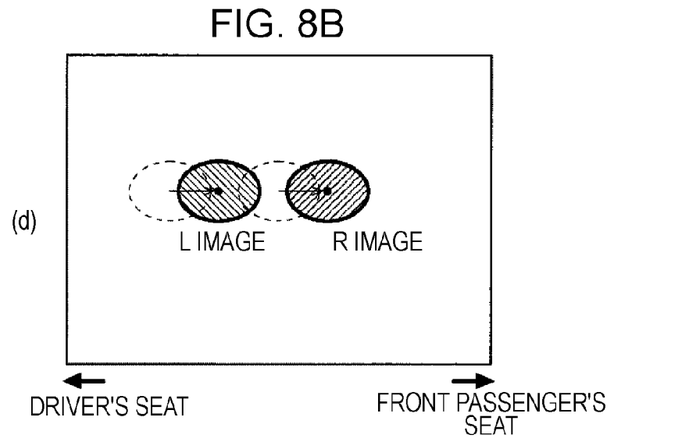

As illustrated in FIG. 6, it is assumed that a detection target medium moves closer to the display panel 100 from the front passenger's seat (side). As the detection target medium moves closer to the display panel 100 from the front passenger's seat, it passes through the points (a), (b), and (c) shown in the drawing in the order of appearance herein. It is reasonably considered that an R image that is detected by the optical sensors 130R at the points (a), (b), and (c) and an L image that is detected by the optical sensors 130L at the points (a), (b), and (c) form a movement pattern illustrated in FIGS. 7A, 7B, and 7C, where FIG. 7A corresponds to the L/R images captured at the point (a), FIG. 7B corresponds to the L/R images captured at the point (b), and FIG. 7C corresponds to the L/R images captured at the point (c). That is, it is reasonably considered that the distance between the R image and the L image becomes shorter as the detection target medium comes closer to the display panel 100. It is further considered that the R image and the L image substantially (i.e., almost) overlap each other at the time when the detection target medium has been brought into contact with the display panel 100. Herein, as has already been explained earlier, it is assumed that the detection target medium moves closer to the display panel 100 from the front passenger's seat side. Under such an assumption, it is reasonably considered that the moving speed of the R image is greater than the moving speed of the L image. On the other hand, if it is assumed that the detection target medium moves closer to the display panel 100 from the driver's seat side, it is reasonably considered that the moving speed of the L image is greater than the moving speed of the R image, although it is not illustrated in the drawing. If it is assumed that the detection target medium moves in the direction parallel to the display panel 100 without changing the distance between the detection target medium and the display panel 100 as measured before and after the movement thereof, an example of which is illustrated as the parallel movement from the point (b) to the point (d) in FIG. 6, it is reasonably considered that the distance between the R image and the L image keeps a constant value (i.e., does not change) although both of the R image and the L image move in accordance with the parallel movement of the detection target medium. A non-limiting example of the movement of the R image and the L image in accordance with the parallel movement of the detection target medium is illustrated in FIG. 8, where FIG. 8A corresponds to the L/R images captured at the point (b), and FIG. 8B corresponds to the L/R images captured at point (d).

The incident direction of incoming light that enters the optical sensors 130R and the incident direction of incoming light that enters the optical sensors 130L differ from each other. In addition, the distance between the light-shielding member 150 and the optical sensors 130R and 130L is considerably smaller than the distance between the light-shielding member 150 and the surface (i.e., touch face) of the display panel 100. For these reasons, a kind of parallax occurs between the optical sensors 130R and the optical sensors 130L. Due to the parallax, the R image and the L image never overlap completely with each other even at the time when the detection target medium is in contact with the display panel 100. Specifically, assuming that the array pitch of the pixels 110 is 40 µm in the actual implementation of the display panel 100, the array pitch p of the optical sensors 130R and 130L takes a value of 20 µm. Herein, it is assumed that the thickness of a liquid crystal layer, that is, the distance between the optical sensors 130R and 130L and the light-shielding member 150, is 5 µm, which is denoted as "d" in FIG. 4. In addition, it is further assumed that the thickness of the monitor-observation-side substrate, which is denoted as D in FIG. 4, is 500 µm, that is, the hundredfold of the thickness of the liquid crystal layer. Under these assumptions, the parallax "q" between the R image and the L image that occurs at the time when the detection target medium is in contact with the surface of the display panel 100 takes a value of 2000 µm, which is the hundredfold of the sensor array pitch p (20 µm). For this reason, even when there is a minor positional deviation between the R image and the L image, it is technically appropriate to judge that the detection target medium is in contact with the display panel 100 as long as the value of the positional deviation thereof is not greater than 2000 µm or so.

Figure 5:
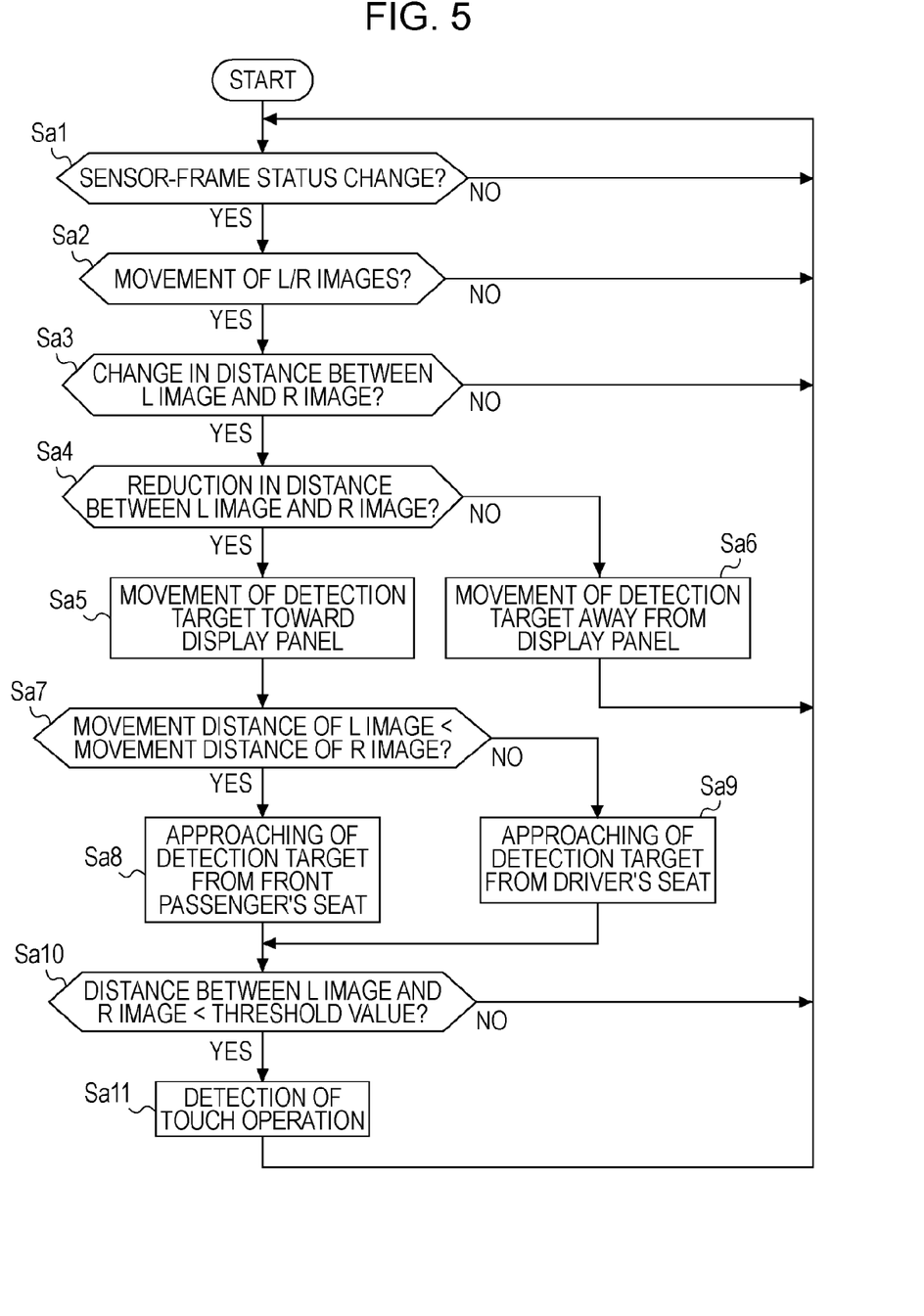
FIG. 5 is a flowchart that schematically illustrates an example of the detection procedure of the display device according to an exemplary embodiment of the invention.

FIG. 5 is a flowchart that schematically illustrates an example of the detection procedure of the display device 1 according to the present embodiment of the invention. As a first step Sa1 of the detection procedure described herein, at the time when the detection results of the optical sensors 130R and 130L are acquired for all pixels, the judgment circuit 20 stores these detection results so as to use them as a comparative basis at the next-time execution of the first step Sa1; and in addition thereto, the judgment circuit 20 reads out the stored detection results that were acquired at the time of the execution of the same first step Sa1 in the preceding sensor frame time period (hereafter referred to as the last sensor frame time period) that is immediately before the current sensor frame time period as the comparison-base data and then compares the detection results acquired in the current sensor frame time period with the read-out detection results acquired in the last sensor frame time period. Then, on the basis of the result of the comparison made between the detection results acquired in the current sensor frame time period with the read-out detection results acquired in the last sensor frame time period, the judgment circuit 20 judges whether the sensor-frame status has changed or not (step Sa1). In the foregoing description, it is explained that the detection results of the optical sensors 130R and 130L are acquired for all pixels. However, the scope of the invention is not limited to such an exemplary configuration. That is, the detection results of the optical sensors 130R and 130L may be acquired for not all but some pixels. If the above-described step Sa1 is executed for the first time, there are no detection results acquired in the last sensor frame time period. Therefore, in such a case, the above-described judgment will be made after the detection results for one sensor frame time period have been stored.

If the judgment circuit 20 judges that the sensor-frame status has not changed, the result of the judgment made in the step Sa1 is NO. If it is judged as NO in the step Sa1, the process loops back to enter a standby state to wait for the next-time execution of the detection procedure, which will be performed after the lapse of one sensor frame time period. On the other hand, if the judgment circuit 20 judges that the sensor-frame status has changed, the result of the judgment made in the step Sa1 is YES. If it is judged as YES in the step Sa1, the process moves on to the next step Sa2. It should be noted that the first step Sa1 is executed at each time when the detection results of the optical sensors 130R and the 130L are acquired for all pixels. Accordingly, in the configuration of the display device 1 according to the present embodiment of the invention, the first step Sa1 is executed in the cycle of sensor frame time periods.

In the next step, the judgment circuit 20 makes a judgment as to whether the sensor-frame status change that was detected in the preceding step Sa1 is attributable to the movement of an R image or an L image (step Sa2). If the sensor-frame status change that was detected in the preceding step Sa1 is not attributable to the movement of the R image or the L image, it means that the sensor-frame status change occurred for any reason other than the movement of a detection target medium such as a finger, though not limited thereto. If the sensor-frame status change occurred for any reason other than the movement of the detection target medium, the judgment circuit 20 outputs a judgment result of NO in this step Sa2. Then, the process loops back to enter a standby state to wait for the next-time execution of the detection procedure, which will be performed after the lapse of one sensor frame time period. On the other hand, if the sensor-frame status change that was detected in the preceding step Sa1 is caused by the movement of the R image or the L image, the judgment circuit 20 outputs a judgment result of YES in this step Sa2. Thereafter, the judgment circuit 20 makes a further judgment as to whether the distance between the R image and the L image has changed from (i.e., in comparison with) that of the last sensor frame time period or not (step Sa3).

If the distance between the R image and the L image has not changed from that of the last sensor frame time period, or, in other words, if the distance between the R image and the L image keeps a constant value, it means that the detection target medium such as a finger, though not limited thereto, has moved in the direction parallel to the display panel 100 without changing the distance between the detection target medium and the display panel 100 as measured before and after the movement thereof, an example of which is illustrated as the parallel movement from the point (b) to the point (d) in FIG. 6 (i.e., the movement of the L/R images from FIG. 8A to FIG. 8B). In such a case, the judgment circuit 20 outputs a judgment result of NO in this step Sa3. Then, the process loops back to enter a standby state to wait for the next-time execution of the detection procedure, which will be performed after the lapse of one sensor frame time period. On the other hand, if the distance between the R image and the L image has changed from that of the last sensor frame time period, the judgment circuit 20 outputs a judgment result of YES in this step Sa3. Thereafter, the judgment circuit 20 makes a further judgment as to whether the distance between the R image and the L image has become smaller than that of the last sensor frame time period (step Sa4).

If the distance between the R image and the L image has not become smaller than that of the last sensor frame time period, or, in other words, if the distance between the R image and the L image has become larger than that of the last sensor frame time period, it means that the detection target medium such as a finger has moved away from the display panel 100. In such a case, the judgment circuit 20 outputs a judgment result of NO in this step Sa4. Accordingly, in the step Sa6, the judgment circuit 20 recognizes that the detection target medium such as a finger has moved away from the display panel 100. Then, the process loops back to enter a standby state to wait for the next-time execution of the detection procedure, which will be performed after the lapse of one sensor frame time period. On the other hand, if the distance between the R image and the L image has become smaller than that of the last sensor frame time period, it means that the detection target medium such as a finger has moved closer to the display panel 100. In such a case, the judgment circuit 20 outputs a judgment result of YES in this step Sa4. Accordingly, in the step Sa5, the judgment circuit 20 recognizes that the detection target medium such as a finger has moved toward the display panel 100. Thereafter, the judgment circuit 20 makes a further judgment as to whether the distance of the movement of the L image is smaller than that of the R image or not (step Sa7). In the configuration of the display device 1 according to the present embodiment of the invention, there is not any specially associated control that will be performed at the time when the judgment circuit 20 recognizes that the detection target medium such as a finger has moved away from the display panel 100 in the step Sa6 or at the time when the judgment circuit 20 recognizes that the detection target medium has moved toward the display panel 100 in the step Sa5. Notwithstanding the foregoing, however, some extra control may be performed as a result of such a judgment. As a non-limiting modification example thereof, display presented on the screen may be switched over as a result of such a judgment.

If the migration distance of the L image is smaller than that of the R image, it means the detection target medium is now coming closer to the display panel 100 from the front passenger's seat side. In such a case, the judgment circuit 20 outputs a judgment result of YES in this step Sa7. Accordingly, in the step Sa8, the judgment circuit 20 recognizes that the detection target medium is now approaching the display panel 100 from the direction of the front passenger's seat. On the other hand, if the migration distance of the L image is not smaller than that of the R image, it means the detection target medium is now coming closer to the display panel 100 from the driver's seat side. In such a case, the judgment circuit 20 outputs a judgment result of NO in this step Sa7. Accordingly, in the step Sa9, the judgment circuit 20 recognizes that the detection target medium is now approaching the display panel 100 from the direction of the driver's seat.

After the directional recognition of the step Sa8 or the step Sa9, the judgment circuit 20 makes a further judgment as to whether the distance "n" between the R image and the L image, an example of which is illustrated in FIG. 7C, is smaller than a predetermined threshold value or not, where the threshold value is preset in consideration of the aforementioned parallax (step Sa10). If the distance n between the R image and the L image is smaller than the predetermined threshold value, the judgment circuit 20 recognizes in the step Sa11 that the detection target medium has been brought into contact with (i.e., has touched) the display panel 100. Accordingly, the display device 1 according to the present embodiment of the invention performs predetermined control. For example, upon the detection of the touch thereof, the judgment circuit 20 calculates an intermediate coordinate between the median point (i.e., center of gravity) of the R image and the median point of the L image as the touch center coordinate. Then, the judgment circuit 20 sends information on the judgment result that the detection target medium has been brought into contact with the display panel 100 together with information on the calculated touch center coordinate thereof to the upper-layer control circuit of the car navigation system. By this means, touch-associated (i.e., touch-triggered) control processing is executed. A few non-limiting conceivable examples of such touch-associated control processing include: the switchover (i.e., changeover) of display presented on the screen and the controlling of video/radio (audio) and the like. As another non-limiting conceivable example thereof, if the touched coordinate corresponds to the display position of a certain icon, processing/control associated with such an icon is executed. After the completion of the step Sa11, the process returns to the first step Sa1. Then, it enters a standby state to wait for the next-time execution of the judgment procedure, which will be performed after the lapse of the sensor frame time period. On the other hand, if the distance n between the R image and the L image is not smaller than the predetermined threshold value, it means that the detection target medium has not yet been brought into contact with the display panel 100, although the detection target medium is now approaching the display panel 100. In such a case, the judgment circuit 20 outputs a judgment result of NO in this step Sa10. Then, the process loops back to enter a standby state to wait for the next-time execution of the detection procedure, which will be performed after the lapse of one sensor frame time period. As explained above, a series of processing in the steps Sa1-Sa11 is repeated at each time when the detection results of the optical sensors 130R and 130L are acquired for all pixels.

In the above-described series of processing in the steps Sa1-Sa11, the judgment circuit 20 outputs a judgment result of YES in each of the steps Sa1, Sa2, Sa3, and Sa4 at the time when a person (i.e., occupant of a vehicle) sitting on a driver's seat or on a front passenger's seat moves a detection target medium such as his/her finger, though not limited thereto, to the display panel 100. Then, the judgment circuit 20 outputs a judgment result of YES in the step Sa7 if the detection target medium is now coming closer to the display panel 100 from the front passenger's seat side. The judgment circuit 20 outputs a judgment result of NO in the step Sa7 if the detection target medium is now coming closer to the display panel 100 from the driver's seat side. At the time when the detection target medium such as a finger has come close to the display panel 100 to the degree that it has been brought into contact with the display panel 100, the judgment circuit 20 outputs a judgment result of YES in the step Sa10. On the other hand, the judgment circuit 20 outputs a judgment result of NO in the step Sa10 if the detection target medium is now coming closer to the display panel 100 but it has not yet come close thereto to the degree that it has been brought into contact therewith. If the judgment circuit 20 judges that the sensor-frame status of the current sensor frame time period has not changed from that of the last sensor frame time period, the judgment circuit 20 outputs a judgment result of NO in the step Sa1. The sensor-frame status does not change if there is not any input operation, or, in other words, movement of the detection target medium. In addition, the sensor-frame status does not change at the time when the movement of the detection target medium toward or away from the display panel 100 is stopped. The judgment circuit 20 outputs a judgment result of NO in the step Sa3 if, although there is some movement of the detection target medium such as a finger of a user, the detection target medium moves in the direction parallel to the display panel 100 without changing the distance between the detection target medium and the display panel 100 as measured before and after the movement thereof. The judgment circuit 20 recognizes that the detection target medium has moved away from the display panel 100 in the step Sa6 if, although the distance between the R image and the L image has changed from that of the last sensor frame time period, it (i.e., the distance between the R image and the L image) has become larger than that of the last sensor frame time period. In the foregoing description of an exemplary embodiment of the invention, it is explained that the judgment circuit 20 makes a judgment as to whether the distance between the R image and the L image has changed from that of the last sensor frame time period or not. That is, a change in the distance between the R image and the L image is taken/used as the basis of the judgment result outputted by the judgment circuit 20. Considering that a change in the distance between the R image and the L image is calculated on the basis of comparison between the distance between the R image and the L image of the last sensor frame time period and the distance between the R image and the L image of the current sensor frame time period, the calculation thereof is substantially the same as the detection of the moving speeds of the R image and the L image. For this reason, the above-described exemplary embodiment of the invention can be modified in such a manner that the moving speeds of the R image and the L image are directly calculated for comparison.

As explained above, in the configuration of the display device 1 according to the present embodiment of the invention, the movement of a detection target medium toward and away from the display panel 100, and direction thereof, is detected on the basis of a change in an R image detected by the optical sensor 130R and a change in an L image detected by the optical sensor 130L that occur as time elapses. In addition, at the time when the distance between the R image and the L image has become smaller than a predetermined threshold value, the judgment circuit 20 detects touch operation/manipulation, or, in other words, recognizes that the detection on target medium has been brought into contact with the display panel 100. Therefore, unlike the aforementioned related art, the elasticity of a detection target medium is not required for detection. For this reason, the display device 1 according to the present embodiment of the invention can detect the touching of its display surface by a user with a hard inelastic object such as a touch pen, though not limited thereto.

In the configuration of the display device 1 according to the present embodiment of the invention, it is explained that one set of the optical sensors 130R and 130L is provided for each pixel 110. However, the requirement for the array density of optical sensors is actually less severe in comparison with that of pixels because image-edge expansion/spread at the time of touching has no relevance thereto. Therefore, as has already been described earlier, one set of optical sensors 130R and 130L may be provided not for each pixel 110 but for each set of a plurality of pixels 110. In the foregoing description, it is explained that the detection results of the optical sensors 130R and 130L are acquired for all pixels. However, the scope of the invention is not limited to such an exemplary configuration. That is, the detection results of the optical sensors 130R and 130L may be acquired for not all but some pixels in each sensor frame.

As has already been described earlier, the display device 1 according to the present embodiment of the invention makes it possible to detect not only the movement of a detection target medium toward and away from the display panel 100 but also the movement of a detection target medium in the direction parallel to the display panel 100 without changing the distance between the detection target medium and the display panel 100 as measured before and after the movement thereof. Specifically, at the time when a detection target medium moves in the direction parallel to the display panel 100 without changing the distance between the detection target medium and the display panel 100 as measured before and after the movement thereof, the judgment circuit 20 outputs a judgment result of NO in the step Sa3. After the successive judgments of NO in the step Sa3 for a predetermined number of sensor frames, the display device 1 according to the present embodiment of the invention can detect the parallel movement thereof. Moreover, it is also possible, as a non-limiting modification example of the above-described configuration, to calculate the moving direction and the moving vector amount of each of the R image and the L image so as to detect the parallel movement direction of a detection target medium such as a finger and the parallel movement vector amount thereof. By this means, it is possible to change a display image in accordance with the parallel movement direction of the detection target medium and the parallel movement vector amount thereof. For example, it is possible to control the scroll direction and the scroll amount of a map image or a menu screen.

Figure 9:
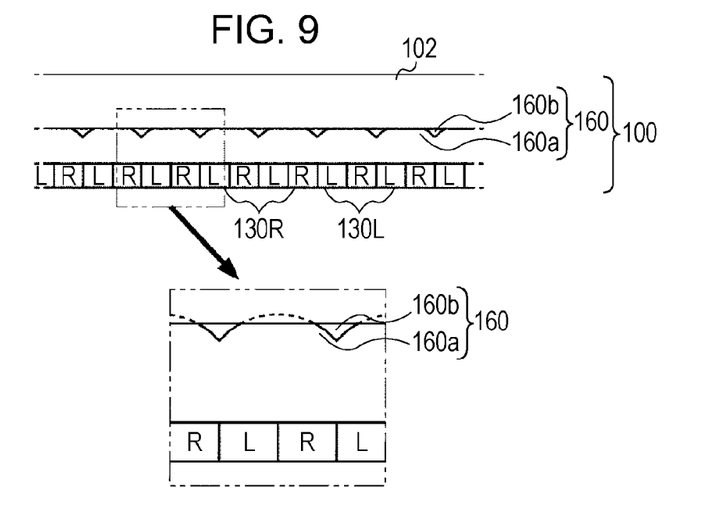
FIG. 9 is a diagram that schematically illustrates an example of the positional relationship between optical sensors and a lens layer in the configuration of the display device according to an exemplary embodiment of the invention.

In the configuration of the display device 1 according to the present embodiment of the invention, it is explained that incident light coming from the front passenger's seat toward each of the optical sensors 130R is blocked at the light-shielding member 150 and thus does not actually enter each of the optical sensors 130R whereas incident light coming from the driver's seat toward each of the optical sensors 130R is not blocked at the light-shielding member 150 and thus enters each of the optical sensors 130R. In like manner, incident light coming from the driver's seat toward each of the optical sensors 130L is blocked at the light-shielding member 150 and thus does not actually enter each of the optical sensors 130L whereas incident light coming from the front passenger's seat toward each of the optical sensors 130L is not blocked at the light-shielding member 150 and thus enters each of the optical sensors 130L. It should be noted that, in the above description, the light-shielding member 150 is nothing more than a mere example of a variety of optical members. That is, other alternative optical member may be adopted as a substitute for the light-shielding member 150 so as to achieve the same function/operation as that of the light-shielding member 150 described above. For example, the light-shielding member 150 may be replaced with a lens layer 160, an exemplary configuration of which is illustrated in FIG. 9. The lens layer 160 includes a lenticular lens portion 160a and a layer portion 160b. The lenticular lens portion 160a of the lens layer 160 has a lens provided for each row of the optical sensors 130R and 130L. The lens of the lenticular lens portion 160a of the lens layer 160 has a semi-cylindrical shape in its cross section, further having an upward convex configuration as shown in the drawing. These lenses extend in the direction perpendicular to the sheet of the drawing. The uppermost (i.e., top) region of each lens of the lenticular lens portion 160a of the lens layer 160 is formed as a flat surface. The flat surface of each lens thereof is in contact with a transparent substrate 102, which is the monitor-observation-side substrate of the display panel 100. A part of the contact surface of the transparent substrate 102 is in contact with the layer portion 160b of the lens layer 160, which is a gap between the lenticular lens portion 160a of the lens layer 160 (or, more specifically, a gap between one lens thereof and another adjacent lens thereof) and the transparent substrate 102. The layer portion 160b of the lens layer 160 is made of a material having an index of refraction that is lower than that of the material of the lenticular lens portion 160a of the lens layer 160. Since the top region of each lens of the lenticular lens portion 160a of the lens layer 160 is formed as a flat surface, it is possible to reduce the thickness of the lens layer 160. In addition, such a flat-top lens configuration allows a greater amount of incident light coming from a driver's seat toward each of the optical sensors 130R to enter each of the optical sensors 130R and further allows a greater amount of incident light coming from a front passenger's seat toward each of the optical sensors 130L to enter each of the optical sensors 130L. By this means, it is possible to improve the detection sensitivity of the optical sensors 130R and 130L. Note that an area corresponding to the opening 154 of FIG. 3 may be formed as a flat region as illustrated in FIG. 9. That is, it is not necessary for the above-mentioned area corresponding to the opening 154 of FIG. 3 to have the shape of a lens. As shown in FIG. 9, the optical sensors 130R and 130L are arrayed in an alternate manner. A lens structure is formed at each area where the optical sensors are arranged in the order of 130R and 130L (in the order of appearance herein) as viewed from the left to the right in FIG. 9. On the other hand, at each area where the optical sensors are arranged in the order of 130L and 130R (in the order of appearance herein) as viewed from the left to the right in FIG. 9, the aforementioned flat region is formed so as to extend from the optical sensor 130L to the optical sensor 130R across the border line therebetween. Because of the positional relationship between the flat region and the optical sensor 130L or the optical sensor 130R, the direction of incident light that enters at each place corresponding to the flat region is limited. On the other hand, at each area where the optical sensors are arranged in the order of 130R and 130L, in the order of appearance herein, as viewed from the left to the right in FIG. 9, the lens limits the direction of light.

The light-receiving layer of the photodiode 134 in the configuration of the display device 1 according to the present embodiment of the invention may be formed as an amorphous silicon layer. More specifically, the light-receiving layer of the photodiode 134 may be formed as an amorphous silicon layer that is deposited on a first electrode thereof, where the first electrode of the photodiode 134 is formed as the same layer as that of the source/drain electrode of the transistor 131 and the like. In such a layer structure, a second electrode of the photodiode 134 is formed as the same layer as that of the aforementioned pixel electrode. If such a layer configuration is adopted, the first electrode, the light-receiving layer, and the second electrode of the photodiode 134 are vertically aligned with one another in the direction perpendicular to the substrate. Such a layer configuration makes it possible to produce/form a photodiode with the addition of an amorphous silicon layer only, which functions as the light sensitive layer thereof.

In the configuration of the display device 1 according to the present embodiment of the invention, it is explained that a black matrix doubles as the light-shielding member 150. However, the scope of the invention is not limited to such an exemplary configuration. For example, if the liquid crystal element 124 is configured as a reflective-type device or as a transflective-type device, a reflective layer may be patterned so as to constitute the light-shielding member 150.

In the configuration of the display device 1 according to the present embodiment of the invention, it is explained that only one type of the display system 120 is provided, thereby offering a single display only. However, the scope of the invention is not limited to such an exemplary configuration. For example, the display device 1 may be provided with two types of the display systems 120. In such a modified configuration, one of these two display systems 120 displays, for example, a navigation image that can be observed from the driver's seat side only, whereas the other of these two display systems 120 displays another image that can be observed from the front passenger's seat side only. If two different kinds of content are displayed as described above, that is, one for the driver and the other for the front passenger, it is preferable that the changing of display images that are offered to the driver should be disabled while changing display images that are offered to the front passenger if it is judged that the front passenger performed touch operation/manipulation. In like manner, it is preferable that the changing of display images that are offered to the front passenger should be disabled while changing display images that are offered to the driver if it is judged that the driver performed touch operation/manipulation. With such a preferred configuration, since the changing of a display image is enabled/allowed only for the person who touched the display surface, it is possible to prevent any discrepancy between the touch-manipulation input direction and the change allowance (i.e., "change-effected" image). As a non-limiting modified configuration of the display device 1 according to the present embodiment of the invention, a so-called mosaic pixel array pattern may be adopted. In the mosaic pixel array pattern, pixels are staggered (i.e., shifted in array thereof) by half size/pitch every row thereof. With such a mosaic pixel array pattern, it is possible to improve display resolution.

In the configuration of the display device 1 according to the present embodiment of the invention, it is judged that the display surface thereof was touched on the condition that (i.e., at the time when) the detection target medium such as a finger has come close to the display panel 100 to the degree that it can be regarded that the detection target medium has been brought into contact with the display panel 100 while taking the aforementioned parallax into consideration. However, the scope of the invention is not limited to such an exemplary configuration. For example, the threshold value may be preset at a value slightly larger than the above-explained one. If such a modified configuration is adopted, it is possible to detect touch-input operation at a point in time at which the detection target medium has come very close to the display panel 100 but has not yet been brought into contact with the display panel 100. That is, it is possible to detect touch-input operation upon the approaching of the detection target medium from either direction that satisfies the increased threshold condition. In the foregoing description of exemplary embodiments of the invention, a liquid crystal device is assumed (i.e., taken) as an example of the display panel 100. However, the scope of the invention is not limited to such an exemplary configuration. For example, the display panel 100 may be embodied as other various kinds of display devices such as an organic EL device or a plasma display device, though not limited thereto. If the optical sensors 130R and 130L having the above-described features are provided in the pixels of such a variety of display devices, it is possible to offer the same advantages as those explicitly or implicitly described above, including but not limited to, the detection of the approaching (including the direction thereof) and/or touching of a detection target medium. Among a variety of electronic apparatuses to which the display device according to the invention could be embodied are, in addition to the car navigation system explained above, a mobile phone, a digital still camera, a television, a viewfinder-type video recorder, a video recorder of a direct monitor view type, (a car navigation device,) a pager, an electronic personal organizer, an electronic calculator, a word processor, a workstation, a videophone, a POS terminal, and so forth. It should be noted that touch detection is useful when applied to each of the non-limiting examples enumerated above.

The entire disclosures of Japanese Patent Application Nos. 2007-138886, filed May 25, 2007 and 2008-097167, filed Apr. 3, 2008 are expressly incorporated by reference herein.

What is claimed is:
1. A display device comprising:
a plurality of display pixels that displays an image on a display screen;
a first optical sensor that is provided so as to correspond to either each one of the plurality of display pixels or each set of more than one pixel, the first optical sensor detecting the amount of incident light;
a second optical sensor that is provided so as to correspond to either each one of the plurality of display pixels or each set of more than one pixel, the second optical sensor detecting the amount of incident light;
an optical member that allows light coming from a first direction to enter the first optical sensors and allows light coming from a second direction to enter the second optical sensors, the second direction being different from the first direction;
a memory circuit that stores a first detection result that is detected in a first time period by means of the first optical sensors and stores a second detection result that is detected in the first time period by means of the second optical sensors;
a comparison circuit that compares, after the detection of a third detection result in a second time period that is subsequent to the first time period by means of the first optical sensors and the detection of a fourth detection result in the second time period by means of the second optical sensors, the third detection result with the first detection result and further compares the fourth detection result with the second detection result; and
a judgment circuit that makes a judgment as to whether the display screen has been touched with a detection target medium or not on the basis of the result of comparison performed by the comparison circuit.

2. The display device according to claim 1, wherein the optical member is a light-shielding member that blocks incident light coming from the second direction toward the first optical sensors and further blocks incident light coming from the first direction toward the second optical sensors.

3. The display device according to claim 2, wherein the light-shielding member has an opening that is formed at a border between the first optical sensor and the second optical sensor adjacent to each other.

4. The display device according to claim 3, wherein, when viewed in an observation direction of the display pixels or viewed from the back thereof, a centerline of the opening of the light-shielding member is in alignment with a borderline between the first optical sensor and the second optical sensor adjacent to each other.

5. The display device according to claim 2, further comprising a black matrix that blocks light at a region each between two adjacent display pixels of the plurality of display pixels, wherein the black matrix doubles as the light-shielding member.

6. The display device according to claim 1, wherein the optical member is provided at a light-entering side of the first optical sensors and the second optical sensors; and the optical member is a convex lens layer, the convex being formed at the light-entering side.

7. A detection method that is used by a display device that has a plurality of display pixels that displays an image on a display screen, a first optical sensor that is provided so as to correspond to either each one of the plurality of display pixels or each set of more than one pixel where the first optical sensor detects the amount of incident light, a second optical sensor that is provided so as to correspond to either each one of the plurality of display pixels or each set of more than one pixel where the second optical sensor detects the amount of incident light, an optical member that allows light coming from a first direction to enter the first optical sensors and allows light coming from a second direction to enter the second optical sensors where the second direction is different from the first direction, the above-mentioned detection method comprising:

storing a first detection result that is detected in a first time period by means of the first optical sensors and storing a second detection result that is detected in the first time period by means of the second optical sensors;

comparing, after the detection of a third detection result in a second time period that is subsequent to the first time period by means of the first optical sensors and the detection of a fourth detection result in the second time period by means of the second optical sensors, the third detection result with the first detection result and further comparing the fourth detection result with the second detection result; and making a judgment as to whether the display screen has been touched with a detection target medium or not on the basis of the result of the above-mentioned comparison.

8. The detection method that is used by the display device according to claim 7, wherein, if it is judged that a distance between an image detected by the first optical sensors and an image detected by the second optical sensors is becoming smaller on the basis of the first detection result, the second detection result, the third detection result, and the fourth detection result, a moving speed of the image detected by the first optical sensors is calculated at the time when the third detection result is compared with the first detection result whereas a moving speed of the image detected by the second optical sensors is calculated at the time when the fourth detection result is compared with the second detection result; and it is judged that the detection target medium is coming closer from the first direction if the moving speed of the image detected by the first optical sensors is lower than the moving speed of the image detected by the second optical sensors whereas it is judged that the detection target medium is coming closer from the second direction if the moving speed of the image detected by the second optical sensors is lower than the moving speed of the image detected by the first optical sensors.

9. The detection method that is used by the display device according to claim 7, wherein it is judged that the display screen has been touched with the detection target medium at the time when the distance between the image detected by the first optical sensors and the image detected by the second optical sensors has become smaller than a predetermined threshold value.

10. A detection method that is used by a display device that has a plurality of display pixels that displays an image on a display screen, a first optical sensor that is provided so as to correspond to either each one of the plurality of display pixels or each set of more than one pixel where the first optical sensor detects the amount of incident light, a second optical sensor that is provided so as to correspond to either each one of the plurality of display pixels or each set of more than one pixel where the second optical sensor detects the amount of incident light, an optical member that allows light coming from a first direction to enter the first optical sensors and allows light coming from a second direction to enter the second optical sensors where the second direction is different from the first direction, the above-mentioned detection method comprising:

storing a first detection result that is detected in a first time period by means of the first optical sensors and storing a second detection result that is detected in the first time period by means of the second optical sensors;

comparing, after the detection of a third detection result in a second time period that is subsequent to the first time period by means of the first optical sensors and the detection of a fourth detection result in the second time period by means of the second optical sensors, the third detection result with the first detection result and further comparing the fourth detection result with the second detection result; and making a judgment as to whether a detection target medium is moving toward the display screen or away from the display screen, or the detection target medium is moving parallel to the display screen on the basis of the result of the above-mentioned comparison.

* * * * *